(12) United States Patent
Pope et al.

(10) Patent No.: US 7,439,513 B2
(45) Date of Patent: Oct. 21, 2008

(54) FAST MICROBOLOMETER PIXELS WITH INTEGRATED MICRO-OPTICAL FOCUSING ELEMENTS

(75) Inventors: Timothy Pope, Sillery (CA); Bruno Tremblay, St-Etienne (CA); Francis Picard, St-Augustin-de-Demaures (CA)

(73) Assignee: Institut National D'Optique, Quebec (CA)

( * ) Notice: Subject to any disclaimer, the term of this patent is extended or adjusted under 35 U.S.C. 154(b) by 3 days.

(21) Appl. No.: 11/204,553

(22) Filed: Aug. 16, 2005

(65) Prior Publication Data

US 2007/0040119 A1    Feb. 22, 2007

(51) Int. Cl.
  *G01J 5/02* (2006.01)
(52) U.S. Cl. ............ 250/353; 250/338.1; 250/339.02
(58) Field of Classification Search .......... 250/338.1, 250/339.02, 338.3, 370.08, 353
See application file for complete search history.

(56) References Cited

U.S. PATENT DOCUMENTS

| | | | |
|---|---|---|---|
| 3,639,765 A * | 2/1972 | Kleinerman | 250/330 |
| 4,379,971 A * | 4/1983 | Smith et al. | 250/342 |
| 4,588,261 A | 5/1986 | Erhardt | |
| 4,689,652 A | 8/1987 | Shimada et al. | |
| 4,754,139 A * | 6/1988 | Ennulat et al. | 250/332 |
| 4,994,664 A | 2/1991 | Veldkamp | |
| 5,136,164 A | 8/1992 | Hendrick, Jr. | |
| 5,288,649 A * | 2/1994 | Keenan | 438/54 |
| 5,367,167 A | 11/1994 | Keenan | |
| 5,401,968 A | 3/1995 | Cox | |
| 5,550,373 A * | 8/1996 | Cole et al. | 250/338.1 |
| 5,701,008 A * | 12/1997 | Ray et al. | 250/352 |
| 5,760,398 A * | 6/1998 | Blackwell et al. | 250/332 |
| 5,808,350 A * | 9/1998 | Jack et al. | 257/440 |
| 6,080,988 A * | 6/2000 | Ishizuya et al. | 250/338.1 |
| 6,157,404 A * | 12/2000 | Marshall et al. | 348/216.1 |
| 6,218,667 B1 * | 4/2001 | Nonaka et al. | 250/353 |
| 6,229,144 B1 * | 5/2001 | Ouvrier-Buffet et al. | 250/338.4 |
| 6,242,740 B1 | 6/2001 | Luukanen et al. | |
| 6,489,615 B2 | 12/2002 | Bluzer | |

* cited by examiner

*Primary Examiner*—David P. Porta
*Assistant Examiner*—Casey Bryant
(74) *Attorney, Agent, or Firm*—Merchant & Gould P.C.

(57) ABSTRACT

Fast microbolometer pixels integrating micro-optical focusing elements are provided. Each microbolometer pixel includes a focusing element located between the pixel body and a substrate, this focusing element preferably sending radiation back towards the central portion of the microbolometer. There is also provided a microbolometer array having a plurality of such microbolometer pixels. Advantageously, to increase the pixel speed, the present microbolometers may be built smaller than the detector and no additional structures need to be attached to said detector.

5 Claims, 5 Drawing Sheets

SIDE VIEW : SECOND PIXEL EMBODIMENT
( REFRACTIVE MICRO-LENS WITH PLANAR MIRROR )

Thermal Response Time $$t = C/G$$

INTEGRATED PIXEL MICRO-OPTICS: 4 X 1 LINEAR ARRAY EXAMPLE

SIDE VIEW: CONCAVE MICRO-MIRROR

SIDE VIEW: SECOND PIXEL EMBODIMENT
(REFRACTIVE MICRO-LENS WITH PLANAR MIRROR)

RAY TRACING - INTEGRATED MICRO-OPTICS

EMBODIMENT INCLUDING ADDITIONAL MICRO-LENS ARRAY

FAST MICROBOLOMETER PIXELS WITH INTEGRATED MICRO-OPTICAL FOCUSING ELEMENTS

FIELD OF THE INVENTION

The present invention relates to fast microbolometer pixels which are provided with integrated micro-optical focusing elements.

DESCRIPTION OF THE PRIOR ART

Microbolometers are now quite common and are more and more used in the imaging field. These detectors are adapted to detect infrared radiation, and can be cooled or uncooled.

The speed of a bolometer detector is proportional to its thermal mass divided by its thermal conductance. Smaller detectors are therefore faster, but because the radiation absorbed by the detector is proportional to its surface area, the speed of smaller detectors comes at the price of poorer thermal resolution. A non-contact means of concentrating incident radiation in a detector unit cell onto a detector that is itself much smaller than the unit cell would provide speed advantages without the penalty of reduced absorption. In the past, it has been proposed to combine arrays of microlenses with detector arrays to improve the effective fill factor of uncooled detectors. The modest improvement in performance possible does not justify the introduction of an additional optical element for standard microbolometer focal planes in video rate imaging applications.

There are an increasing number of planned satellite earth observation missions including payloads with infrared imaging channels. The cost of large and even 'small' satellite platforms being very great, these missions are now typically planned for micro or even nano-satellite platforms. In this case, the order of magnitude mass and power savings associated with the use of uncooled instead of cooled detector arrays is a major advantage and may even be necessary for payload feasibility. However, in contrast to cooled photonic detectors, uncooled detectors respond very slowly to incoming radiation, and even recent 'fast' microbolometer pixels are too slow to resolve ground spots below about 250 m for a low earth orbit satellite. Many missions require 50 or 100 m ground spots, so there is a great unmet need for faster uncooled detectors. The same considerations apply to linear uncooled arrays for industrial and commercial applications, where the response time of the detectors limits the achievable data acquisition rates. The development of a faster uncooled detector will greatly extend the useful range of applications for linear uncooled detector arrays.

SUMMARY OF THE INVENTION

It is thus an object of the present invention to provide fast microbolometer pixels with integrated micro-optical focusing elements, where no additional structures attached to the detector which would otherwise increase the thermal mass are required.

In accordance with a first aspect of the invention, there is provided a microbolometer pixel characterized in that said microbolometer pixel comprises a focusing element, said focusing element being located between a pixel body and a substrate.

In accordance with another aspect of the invention, there is provided a microbolometer array comprising a plurality of microbolometer pixels, wherein each of said microbolometer pixels comprises a focusing element, said focusing element being located between a pixel body and a substrate.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

The present invention is directed to fast microbolometers that are intentionally built smaller than the detector unit cell to increase pixel speed and provided with some form of focusing element to improve the thermal resolution of the microbolometer, and of the resulting array.

In this case, it has been found that a microoptics/detector combination is the preferred way to collect the required incident radiation without using an additional structure attached to the detector (such as an antenna) that would in turn increase the thermal mass. As an alternative to the use of a separate microlens array, it is preferable to implement monolithically an array of parabolic mirrors underneath the detectors themselves. This approach has the additional advantage of eliminating alignment concerns and simplifying packaging, at the expense of a more complicated fabrication process flow. A standard detector with 50 μm pitch has a central portion area on the order of 1600 μm². If a detector 15×15 μm (225 μm²) were built with the same film thicknesses, a 7.1× reduction in thermal mass would be achieved. For a detector technology based on thin structural layers, this reduction in thermal mass is more than sufficient to achieve the detector speed required for satellite imaging with a 50 m ground spot.

Detailed simulations using ZEMAX physical optics propagation software have confirmed that for low f/# and small pixel size the integrated mirror approach provides much superior performance to the separate microlens array approach.

Figure 1:
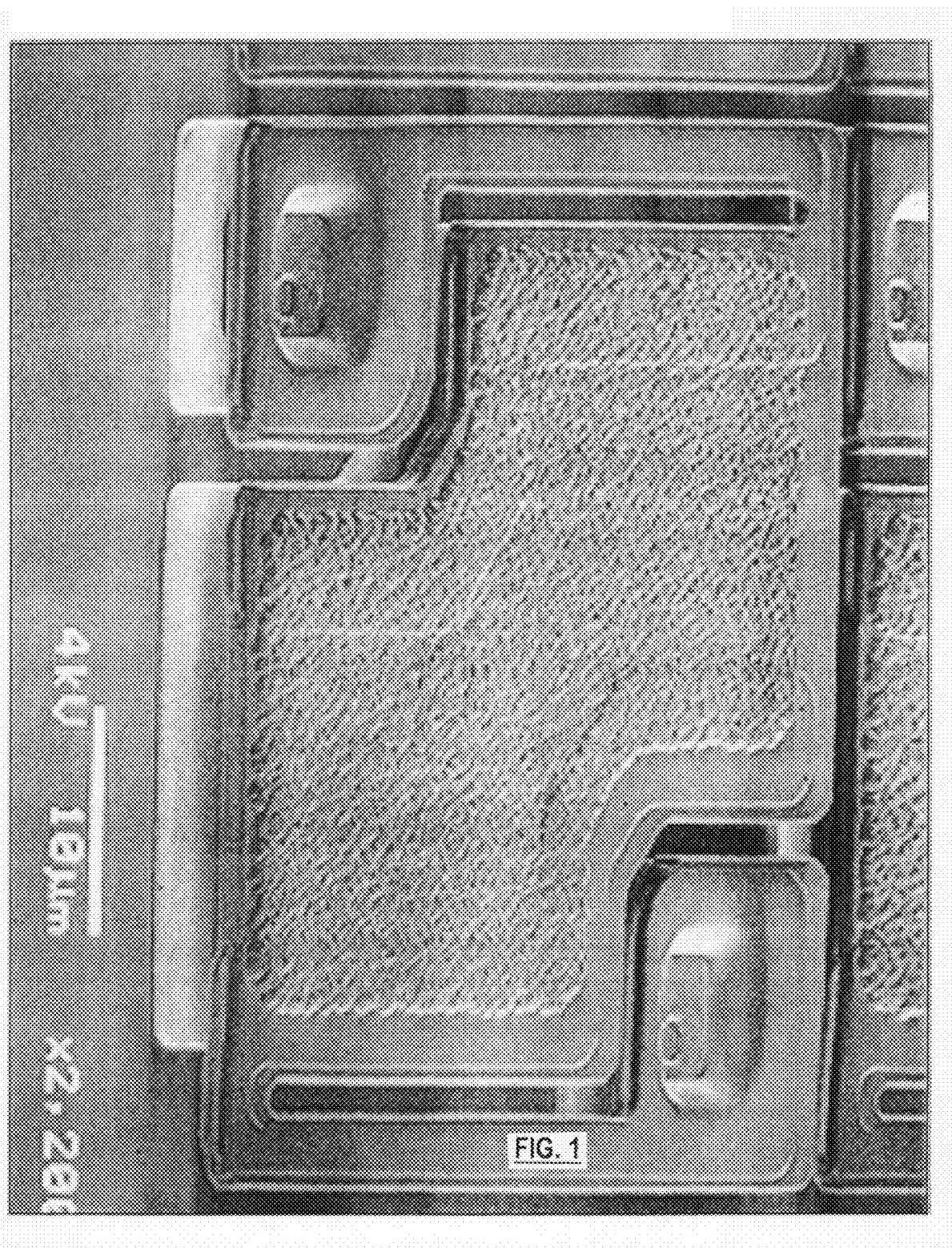
FIG. 1 is a photograph of a microbolometer pixel.
Figure 2:
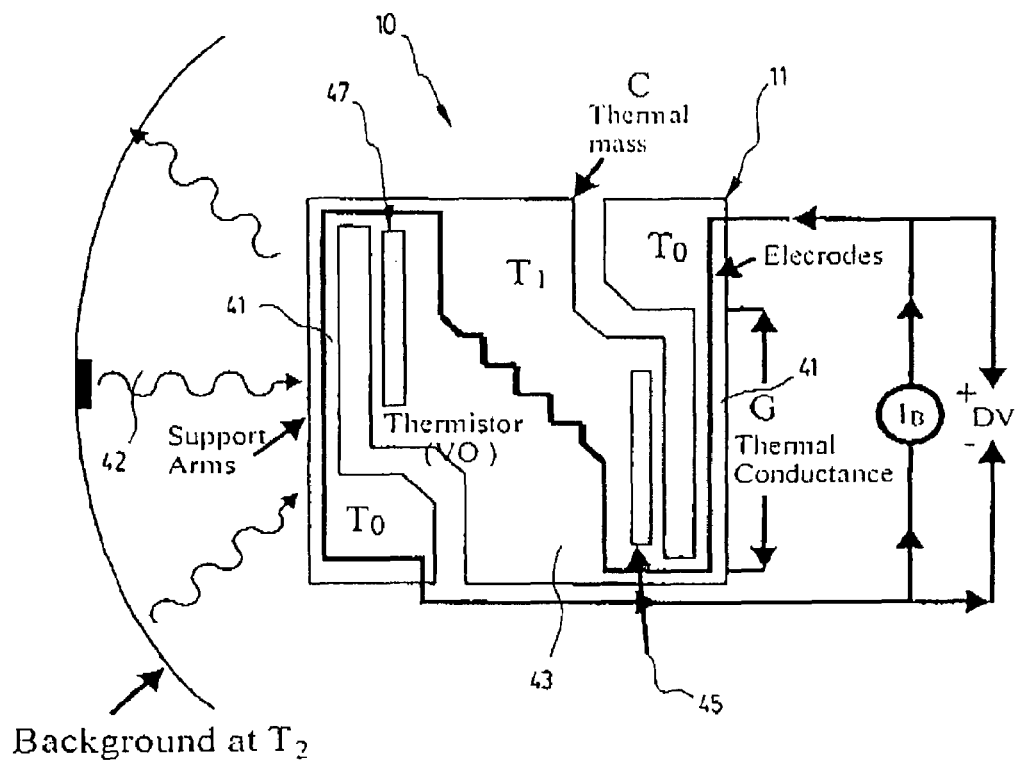
FIG. 2 is a schematic representation of a prior art microbolometer and associated electric diagram.
Figure 3:
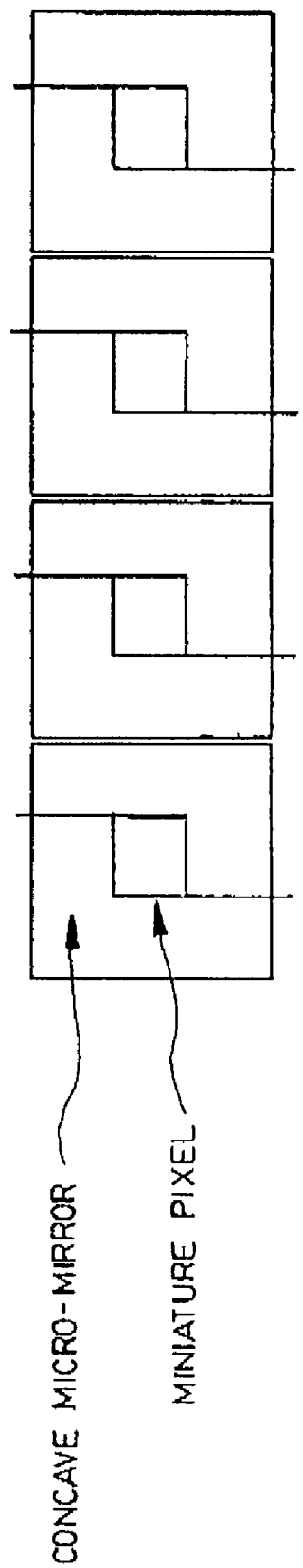
FIG. 3 is a schematic representation of a top view of a 4×1 microbolometer array according to a preferred embodiment of the invention.

A typical bolometer 10 is shown in FIGS. 1 and 2. Bolometer 10 includes two support arms 41 and central portion 43. The support arms 41 connect the central portion 43 to substrate 11. Thermal radiation 42 incident on the bolometer is absorbed and raises the temperature of the central portion 43 with respect to the substrate 11, the arms 41 providing thermal isolation between the two. The central portion 43 includes a thermistor film (not shown) and the arms 41 include electrodes 44 such that the thermistor resistance, which depends on the intensity of the incident thermal radiation, can be measured by an electrical bias.

Thus, the present invention concerns a microbolometer pixel 10 mounted on a substrate 11. The substrate is provided with a focusing element 20.

Figure 4:
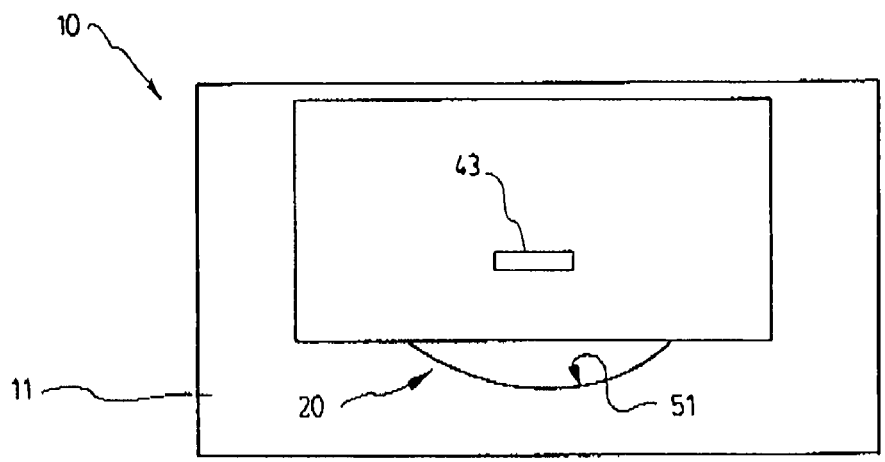
FIG. 4 is a side view of one of the microbolometers of FIG. 3, where the focusing element is a concave mirror.
Figure 6:
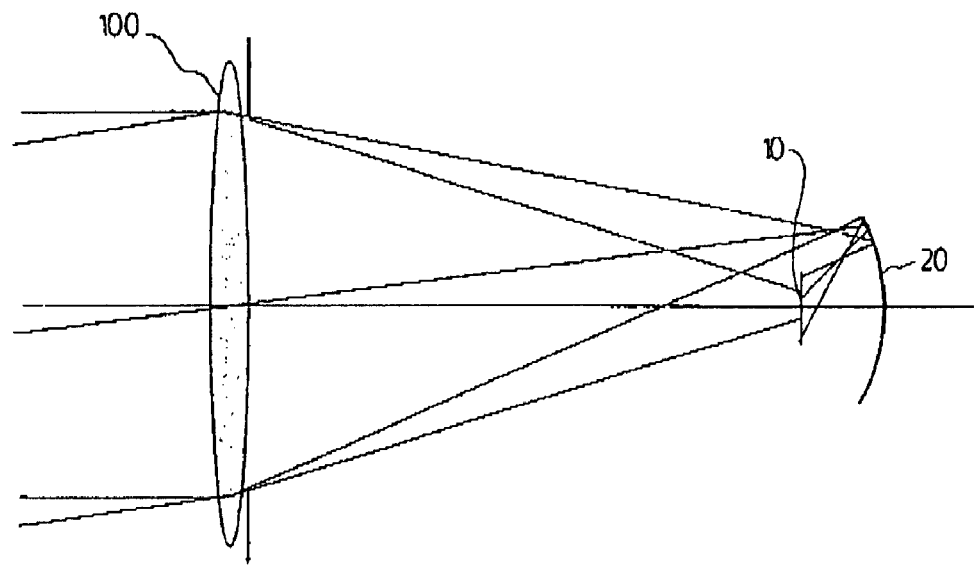
FIG. 6 is a ray tracing diagram showing one pixel of a microbolometer array with integrated micro-optics located at the focal plane of a camera lens.

In a first preferred embodiment shown in FIGS. 4 & 6, the focusing element 20 is a concave mirror 51 which reflects radiation back towards the central portion 43 of the microbolometer. In a preferred embodiment, the concave mirror is preferably parabolic.

Figure 5:
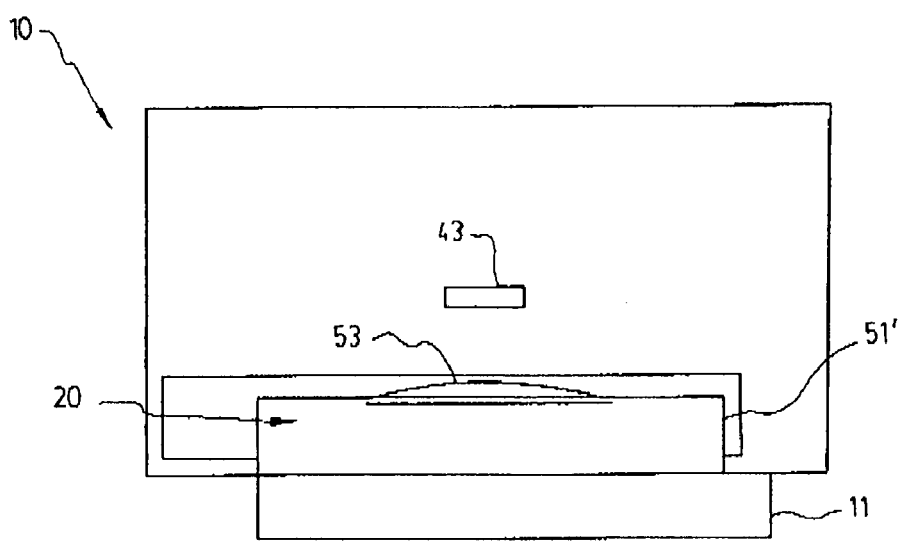
FIG. 5 is a side view of one of the microbolometers of FIG. 3, where the focusing element is a planar mirror having a refractive microlens on the planar mirror.

In a second preferred embodiment shown in FIG. 5, the focusing element 20 is a planar mirror 51' having a top surface. A refractive micro lens 53 is placed on the top surface of the mirror 51', again to focus radiation back towards the central portion 43 of the microbolometer.

Figure 7:
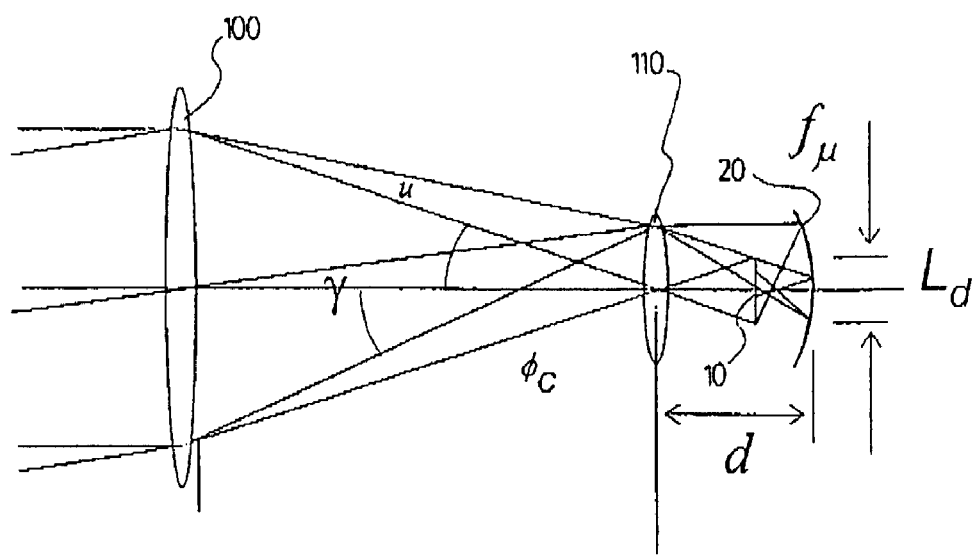
FIG. 7 is a ray tracing diagram showing one pixel of a microbolometer array with integrated micro-optics according to another preferred embodiment of the invention also located at the focal plane of a camera lens.

Advantageously, one or the other of the preferred embodiments may be further improved upon as the embodiment of FIG. 7 shows.

In FIG. 6, which is a schematic representation of ray tracing, the bolometer 10 and reflective element 20 are shown with lens 100 which represents the principal optics of the imaging system (and not actually part of the detector assembly). The ray tracing shows how incident radiation is focussed on the bolometer 10, and reflected by the reflective element 20.

FIG. 7 expands on the invention by adding a micro-lens 110 above the microbolometer. Classical optical simulations have shown a significant advantage to the combined use of the reflective element and an additional microlens array, as shown in FIG. 7.

Although the present invention has been explained hereinabove by way of preferred embodiment thereof, it should be pointed out that any modifications to these preferred embodiment within the scope of the appended claims is not deemed to alter or change the nature and scope of the present invention.

The invention claimed is:

1. A microbolometer pixel comprising a focusing element, said focusing element being located between a pixel body and a substrate, wherein said focusing element comprises a planar mirror having a top surface, and a refractive lens located on said top surface of said planar mirror.

2. A microbolometer pixel according to claim 1, wherein said lens is parabolic.

3. A microbolometer array comprising a plurality of microbolometer pixels, wherein each of said microbolometer pixels comprises a focusing element, said focusing element being located between a pixel body and a substrate, wherein said focusing element comprises a planar mirror having a top surface, and a refractive lens located on said top surface of said planar mirror.

4. A microbolometer array according to claim 3, wherein said lens is parabolic.

5. A microbolometer array according to claim 3, wherein said microbolometer array further comprises a micro-lens array located above said microbolometer array.

* * * * *